(12) United States Patent
Siniscalchi et al.

(10) Patent No.: US 6,904,145 B2
(45) Date of Patent: Jun. 7, 2005

(54) ADSL FRONT-END IN A LOW VOLTAGE PROCESS THAT ACCOMMODATES LARGE LINE VOLTAGES

(75) Inventors: Patrick P. Siniscalchi, Sachse, TX (US); Richard K. Hester, McKinney, TX (US); Donald C. Richardson, Plano, TX (US); Glenn H. Westphal, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 615 days.

(21) Appl. No.: 09/957,955

(22) Filed: Sep. 21, 2001

(65) Prior Publication Data

US 2002/0039413 A1 Apr. 4, 2002

Related U.S. Application Data

(60) Provisional application No. 60/236,847, filed on Sep. 29, 2000.

(51) Int. Cl.[7] ............... H04M 1/00; H04M 9/00; H04M 9/08
(52) U.S. Cl. ............... 379/400; 379/394; 379/395
(58) Field of Search ............... 379/399.07, 400–403, 379/412, 413.02, 390.03, 394, 395, 22.02, 22.04, 22.05

(56) References Cited

U.S. PATENT DOCUMENTS

| | | | | |
|---|---|---|---|---|
| 5,953,412 A | * | 9/1999 | Sheets et al. | 379/414 |
| 6,226,322 B1 | * | 5/2001 | Mukherjee | 375/229 |
| 6,226,331 B1 | * | 5/2001 | Gambuzza | 375/258 |

* cited by examiner

Primary Examiner—Curtis Kuntz
Assistant Examiner—Alexander Jamal
(74) Attorney, Agent, or Firm—Alan K. Stewart; W. James Brady, III; Frederick J. Telecky, Jr.

(57) ABSTRACT

The asymmetric digital subscriber line receive channel includes: first and second external resistors 20 and 22 coupled to a telephone line 24 and 26; a coarse programmable gain amplifier CPGA formed in a low voltage process having inputs coupled to the first and second external resistors 20 and 22; and a fine programmable gain amplifier PGA1 coupled to an output of the coarse programmable gain amplifier CPGA, and having a very fine gain trim adjustment to compensate for a mismatch between the external resistors 20 and 22 and the coarse programmable gain amplifier CPGA.

8 Claims, 1 Drawing Sheet

ADSL FRONT-END IN A LOW VOLTAGE PROCESS THAT ACCOMMODATES LARGE LINE VOLTAGES

This application claims priority under 35 USC § 119 (e) (1) of provisional application No. 60/236,847 filed Sep. 29, 2000.

FIELD OF THE INVENTION

This invention generally relates to electronic systems and in particular it relates to an Asymmetric Digital Subscriber Line front-end that accommodates large line voltages in a low voltage process.

BACKGROUND OF THE INVENTION

Voltages on twisted pair telephone lines can be as large as 30 V peak-peak differential at the receiver input of an Asymmetric Digital Subscriber Line (ADSL) modem. Some prior art solutions use a high voltage process. Other prior art solutions use a low voltage process but require a separate, high voltage integrated circuit (IC) prior to the ADSL front-end. The problem is for the receiver amplifier to handle such large line voltages without the IC using a high voltage process.

SUMMARY OF THE INVENTION

An asymmetric digital subscriber line receive channel includes: first and second external resistors coupled to a telephone line; a coarse programmable gain amplifier formed in a low voltage process having inputs coupled to the first and second external resistors; and a fine programmable gain amplifier coupled to an output of the coarse programmable gain amplifier, and having a very fine gain trim adjustment to compensate for a mismatch between the external resistors and the coarse programmable gain amplifier.

DETAILED DESCRIPTION OF PREFERRED EMBODIMENTS

Figure 1:
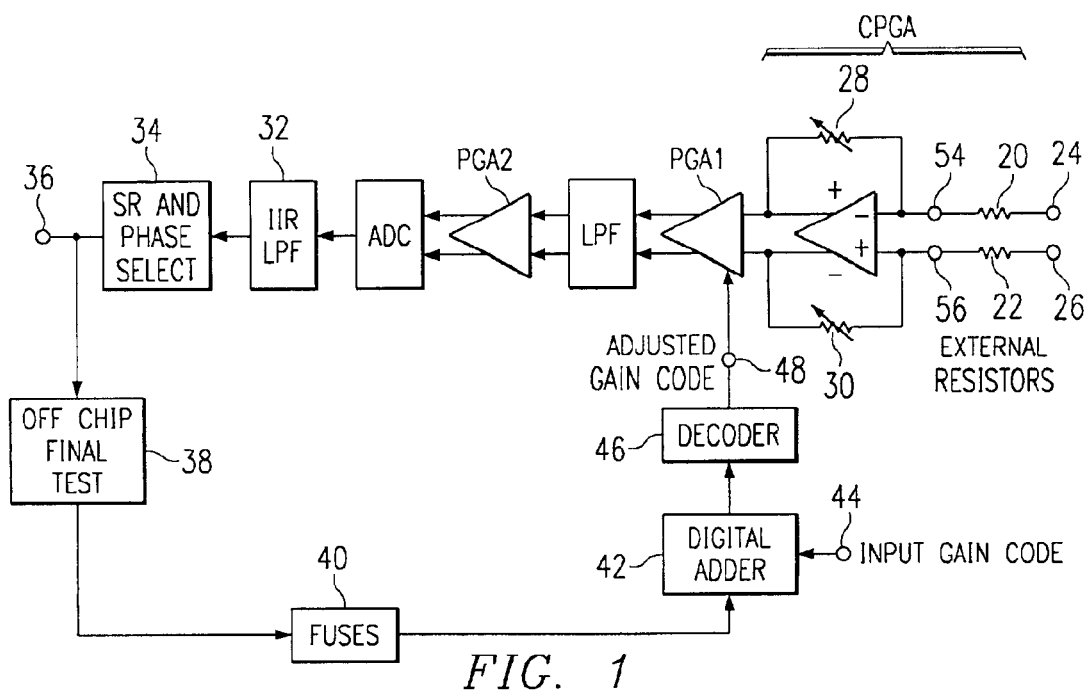
FIG. 1 is a preferred embodiment ADSL system block diagram for the receive channel with external input resistors.

FIG. 1 shows a preferred embodiment ADSL system block diagram for the receive channel with external input resistors. The two external input resistors 20 and 22 are coupled to a telephone line at nodes 24 and 26. External resistors 20 and 22 form the input of coarse programmable gain amplifier CPGA. The CPGA adjusts the gain of the input signal at nodes 24 and 26 to compensate for signal attenuation in the telephone lines. Internal adjustable resistors 28 and 30 set the gain of the CPGA. Programmable gain amplifier PGA1 is coupled to the output of CPGA and provides finer gain control than CPGA. A low pass filter LPF is coupled to the output of PGA1 and filters noise and echo from the input signal. Another programmable gain amplifier PGA2 is coupled to the output of low pass filter LPF and provides a fine gain control to amplify the signal after filtering out echo and noise.

The signal is then input into an analog-to-digital converter ADC. In the preferred embodiment, the ADC is a 14 bit analog-to-digital converter. Once the signal has been converted to digital by the ADC, an infinite impulse response low pass filter 32 provides all the anti-aliasing required to allow decimation down to a lower frequency from the higher frequency provided by the ADC. In the preferred embodiment, the ADC provides a signal at 2208 KHz and the filter 32 allows for decimation down to 276 KHz. The signal is then fed through a sample rate and phase select block 34 before being output to node 36, where it is available for further digital signal processing.

For calibration purposes, an external test device 38 is used to measure the output signal at node 36. The test device 38 then provides a gain adjustment signal to gain adjustment fuses 40 which are blown accordingly. In the preferred embodiment, the fuses 40 provide a gain adjustment signal which can vary the output signal at node 36 from −2.5 db to +2.5 db in one half db increments. A digital adder 42 then combines the output from fuses 40 with a user input gain code provided at node 44. In the preferred embodiment, the user input gain code can vary from 0 to 6 db in 1 db increments. This provides for an output from the digital adder 42 that varies from −2.5 db to +8.5 db in one half db increments. A decoder 46 is coupled to the digital adder 42 to provide a final adjusted gain code at node 48.

Figure 2:
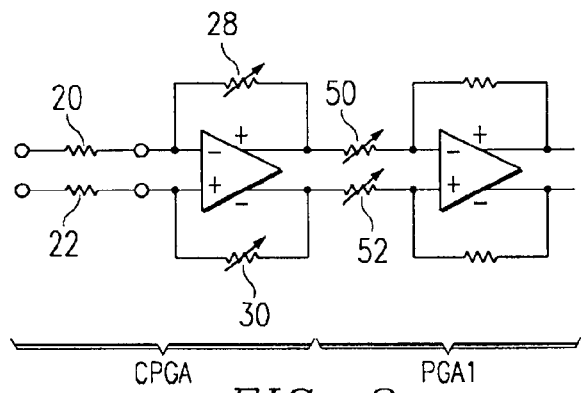
FIG. 2 is a schematic circuit diagram of a coarse programmable gain amplifier and a programmable gain amplifier in the ADSL system of FIG. 1.
Figure 3:
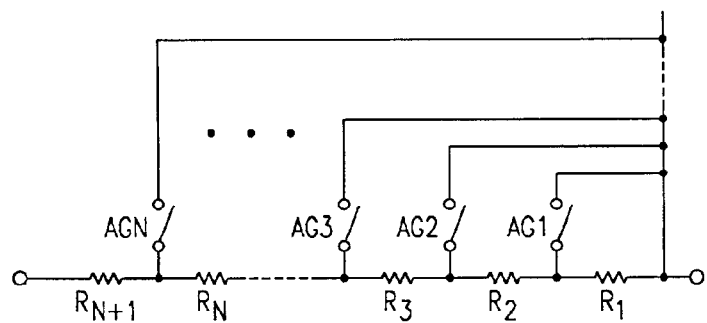
FIG. 3 is a schematic circuit diagram of an adjustable resistor.

The gain code at node 48 is then fed to adjustable resistors 50 and 52 in PGA1, as shown in FIG. 2. For the preferred embodiment, each of the adjustable resistors 50 and 52 is implemented as shown in FIG. 3. The adjustable resistor of FIG. 3 includes resistors $R_1$–$R_{N+1}$ and adjustable gain signals AG1–AGN which are provided by decoder 46. For the preferred embodiment gain variation of −2.5 to +8.5 db in one half db increments, N=22, which provides adjustable gain signals AG1–AG22.

The two external resistors 20 and 22, shown in FIG. 1, serve as the input resistors to the low noise coarse programmable gain amplifier (CPGA) that begins the ADSL receive channel. The large telephone line voltages are dropped across these external resistors 20 and 22 allowing the input pins 54 and 56 of the ADSL IC to remain constant since they are the virtual ground inputs of the amplifier. This allows an ADSL front-end processed in a 3 Volt process to directly connect to the telephone line hybrid circuit and process signals up to 30 Vp-p differentially.

The gain error that could result from the mismatch of the external input resistors 20 and 22 and the adjustable internal feedback resistors 28 and 30 in the CPGA, shown in FIG. 2, is calibrated out via the very fine gain trim adjustment that is made at final test to the programmable gain amplifier PGA1 immediately following the CPGA. The trim adjustment, made by blowing fusible polysilicon links 40, has finer resolution than the normal gain steps of PGA1 and is added digitally by adder 42 to the programming word for PGA1. Therefore the trim is invisible to the end user. Having an accurate absolute gain in the receive path is critical to the ADSL modem's performance and the gain adjustment to PGA1 provides this feature as well as removing any gain error caused by an internal to external resistor mismatch.

The preferred embodiment solution described above provides the following advantages. It allows an ADSL front-end formed in a low voltage process to directly connect to a high voltage line hybrid circuit via two external resistors. This eliminates the need for a receive amplifier in a high voltage process prior to the ADSL front-end. This causes less power dissipation. The solution uses a finer resolution trim to adjust for internal and external resistor mismatches and accurately set the receive channel gain. It removes the need for special ESD circuitry to accommodate the large line voltages (larger than the supply voltages to the IC). It provides an accurate receive path gain essential for good modem performance. This solution allows the use of low voltage digital CMOS on the same IC as the analog front-end.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. An asymmetric digital subscriber line receive channel comprising:

first and second external resistors coupled to a telephone line;

a coarse programmable gain amplifier formed in a low voltage process having inputs coupled to the first and second external resistors;

a fine programmable gain amplifier coupled to an output of the coarse programmable gain amplifier, and having a very fine gain trim adjustment to compensate for a mismatch between the external resistors and the coarse programmable gain amplifier;

a low pass filter coupled to an output of the fine programmable gain amplifier;

a second fine programmable gain amplifier coupled to an output of the low pass filter;

an analog-to-digital converter coupled to an output of the second fine programmable gain amplifier;

digital processing circuitry coupled to an output of the analog-to-digital converter an external test device coupled to an output of the digital processing circuitry;

a fuse circuit coupled to an output of the external test device for providing a gain adjustment signal in response to a measurement by the external test device; and a digital adder for combining the gain adjustment signal with a user input gain code.

2. The device of claim 1 wherein the fine gain trim adjustment comprises an adjustable resistance.

3. The device of claim 1 further comprising a decoder coupled to an output of the digital adder for providing an adjusted gain code to the fine programmable gain amplifier.

4. The device of claim 1 wherein the digital processing circuitry comprises:

a digital low pass filter coupled to the output of the analog-to-digital converter; and a sample rate and phase select device coupled to an output of the digital low pass filter.

5. A circuit comprising:

first and second external resistors coupled to a transmission line;

a coarse programmable gain amplifier formed in a low voltage process having inputs coupled to the first and second external resistors;

a fine programmable gain amplifier coupled to an output of the coarse programmable gain amplifier, and having a very fine gain trim adjustment to compensate for a mismatch between the external resistors and the coarse programmable gain amplifier;

a low pass filter coupled to an output of the fine programmable gain amplifier;

a second fine programmable gain amplifier coupled to an output of the low pass filter;

an analog-to-digital converter coupled to an output of the second fine programmable gain amplifier;

digital processing circuitry coupled to an output of the analog-to-digital converter an external test device coupled to an output of the digital processing circuitry;

a fuse circuit coupled to an output of the external teat device for providing a gain adjustment signal in response to a measurement by the external test device; and a digital adder for combining the gain adjustment signal with a user input gain code.

6. The device of claim 5 wherein the fine gain trim adjustment comprises an adjustable resistance.

7. The device of claim 5 further comprising a decoder coupled to an output of the digital adder for providing an adjusted gain code to the fine programmable gain amplifier.

8. The device of claim 5 wherein the digital processing circuitry comprises:

a digital low pass filter coupled to the output of the analog-to-digital converter; and a sample rate and phase select device coupled to an output of the digital low pass filter.

* * * * *